United States Patent [19]

Wank et al.

[11] Patent Number: 4,828,901

[45] Date of Patent: May 9, 1989

[54] INJECTION-MOULDED ARTICLE AND A PROCESS FOR THE PRODUCTION THEREOF

[75] Inventors: Joachim Wank, Dormagen; Werner Waldenrath, Cologne; Eckart Reese, Dormagen, all of Fed. Rep. of Germany

[73] Assignee: Bayer Aktiengesellschaft, Leverkusen, Fed. Rep. of Germany

[21] Appl. No.: 53,870

[22] Filed: May 26, 1987

[30] Foreign Application Priority Data

Jun. 6, 1986 [DE] Fed. Rep. of Germany ....... 3619081

[51] Int. Cl.$^4$ .............................................. B32B 15/08
[52] U.S. Cl. .................................. 428/76; 427/213.3; 427/213.36; 428/334; 428/335; 428/423.1; 428/423.5; 428/423.7; 428/424.6; 428/425.8; 428/457

[58] Field of Search ............... 428/424.6, 423.1, 425.8, 428/423.7, 334, 335, 423.5, 76; 524/591; 528/174; 525/471; 427/213.3, 213.36

[56] References Cited

U.S. PATENT DOCUMENTS

| | | | |
|---|---|---|---|
| 3,365,517 | 1/1968 | Barth | 525/462 |
| 3,479,310 | 11/1969 | Dieterich | 524/591 |
| 3,538,055 | 11/1970 | Camilleri et al. | 428/424.6 |
| 3,960,815 | 6/1976 | Darsow et al. | 528/174 |
| 4,335,187 | 6/1982 | Rukavina et al. | |
| 4,521,469 | 6/1985 | Butt et al. | 428/76 X |
| 4,781,958 | 11/1988 | Gilbert | 428/76 |

*Primary Examiner*—Thomas J. Herbert
*Attorney, Agent, or Firm*—Connolly & Hutz

[57] ABSTRACT

An invention relates to new injection-moulded articles made from metal/plastic composite systems containing a polyurethane adhesive (intermediate) layer, and a process for the preparation thereof.

7 Claims, No Drawings

INJECTION-MOULDED ARTICLE AND A PROCESS FOR THE PRODUCTION THEREOF

The invention relates to new injection-moulded articles of metal/plastic composite systems having a polyurethane adhesive (intermediate) layer and to a process for the production thereof.

Metal/plastic composite systems are required, for example, in the electrical and electronics industry for insulating housing parts. Such composite systems are generally produced by encapsulating or coating the contact elements in or with the appropriate plastic material.

In order to improve the adhesion between the metal and plastic parts, the metal parts are embossed, perforated, moulded in a meander shape etc., in the region of the plastic encapsulation. Although a high loadability against mechanical tensile stress can be achieved by means of this type of mechanical modification, a moisture-tight or compression-resistant composite is not achieved thereby, since hairline cracks occur on cooling due to the different expansion coefficient of metal and plastic. For applications in which vapour and compression resistance is absolutely necessary, numerous experiments have been carried out in order to achieve this goal. In the solutions hitherto, resin systems which had a surface adhesion both to the metal and to the plastic had been applied, after the encapsulation or coating of the metal parts, onto the inside and outside of the housings in the region of the metal contacts.

Since these are usually very thin layers, these had the disadvantage that they developed hairline cracks on mechanical stress and thus no longer performed their task.

There has therefore been no lack of attempts to achieve, in the region of the encapsulation, a composite between plastic and metal which fulfils the demands regarding vapour and compression resistance. The possibility known hitherto of achieving this aim in the case of a few metal/plastic combinations consists of using epoxy resins as promoters of adhesion between metal and plastic. The limitation to only a few plastics is caused by the fact that epoxy resins bond to only a few plastic materials, are very brittle, and, in addition, are difficult to process, since it is a 2-component system.

U.S. Pat. No. 3,538,055 discloses that plastics or metals can be bonded using a polyurethane adhesive. It does not disclose injection-moulded articles and processes for the production thereof.

The object of the present invention was to produce vapour-tight and compression-resistant metal/plastic composite systems in a simple fashion.

The invention relates to injection-moulded articles, containing a metal/plastic composite system which is bonded via an adhesion promoter, characterized in that a polyurethane is included as adhesion promoter.

In a preferred embodiment, a system based on a linear polyester urethane from polyethylene adipinate having a molecular weight of 2,000 and a toluylene diisocyanate is included as polyurethane.

In a particularly preferred embodiment, a system based on polybutylene adipinate having a molecular weight of 1,000 to 8,000 and a mixture of hexamethylene diisocyanate and isophorone diisocyanate in the ratio from 1:99 to 99:1 is included as polyurethane.

In a preferred embodiment, a thermoplastic, particularly a cellulose ester, PVC, polyamide, polycarbonate, polysulphone, ABS, polymethylene methacrylate, polyphenylene sulphide, polyalkylene terephthalate, polyarylene terephthalate, polyolefin or polyphosphonates, is included as plastic.

The invention furthermore relates to a process for the production of an injection-moulded article from a metal/plastic composite system by encapsulating the metal component with the thermoplastic melt of a plastic, characterized in that a polyurethane is used between the metal and the plastic as adhesion promoter.

Shaped metal articles which are suitable according to the invention are those made from known nonferrous and ferrous metals, preferably copper and its alloys, and also noble metals.

For preparing the polyurethane layers which are suitable according to the invention both as aqueous dispersions, drying to transparent films, of preferably linear polyester polyurethanes and organic solutions, drying to transparent films, of preferably linear polyester polyurethanes which, if appropriate, contain a higher functional polyisocyanate as crosslinking agent, can be used. Suitable polyurethane dispersions are, for example, those based on linear polyester diols, aromatic or aliphatic diisocyanates and, if appropriate, the conventional chain extenders, which have been prepared with concomitant use of ionic constructional components according to U.S. Pat. No. 3,479,310 or DE-A-No. 1,495,847. The aqueous dispersions of preferably linear polyester polyurethanes, having carboxylate and sulphonate groups, as can be obtained according to DE-A-No. 2,804,609, are also very well suited. In the case of the use of organic solutions of preferably linear polyester polyurethanes, preferably solutions of nonionic linear polyester polyurethanes in suitable solvents are suitable. These polyurethanes are preferably products of the reaction between (i) aromatic diisocyanates, such as 2,4- and/or 2,6-diiso-cyanatotoluene, 4,4'-diisocyanatodiphenylmethane, hexa-methylene diisocyanate, isophorone diisocyanate or 1,5-diisocyanatonaph-thalene, or mixtures thereof, with (ii) polyester diols of the molecular weight range ($\overline{M}w$) 1,000 to 4,000, particularly based on adipic acid and suitable glycols, such as ethylene glycol, 1,4-dihydroxybutane, 1,6-dihydroxyhexane and mixtures thereof, and, if appropriate, (iii) chain extenders, for example the last-mentioned glycols, the reactants being used with maintenance of an NCO/OH equivalent ratio from 0.9:1 to 1:1.1, preferably 0.95:1 to 1:1, and, if appropriate, 0.1 to 2 moles of chain extender or chain extender mixture being used per mole of polyester diol. Suitable solvents for such polyester polyurethanes are, for example, ethyl acetate, butyl acetate, methyl ethyl ketone, methyl isobutyl ketone or mixtures comprising such solvents. The dispersions or solutions are generally used with a solids content of 10-40% by weight. It can often be expedient to incorporate minor amounts of a higher functional polyisocyanate, for example tris-(6-isocyanatohexyl)-biuret, into the solutions mentioned in order to improve the mechanical properties of the polyurethane film which is finally obtained.

Polyurethane systems which are likewise suitable are reaction products of polyethers with diisocyanates, polypropylene oxide being a preferred polyether, and these polyethers being reacted with the abovementioned diisocyanates in a known manner, and the reaction being carried out so that either polyurethanes having a free NCO content of 0.5 to 10% by weight, preferably 0.5 to 5% by weight, or polyurethanes having a free OH content of 0.5 to 15% by weight, preferably 0.5 to 5% by weight, are obtained.

The polyurethane adhesives described can be hardened in order to increase their temperature resistance.

For this purpose the polyurethane adhesives are reacted with diols or amine-containing epoxide resins and the polyurethane adhesives mentioned are reacted with isocyanates, preferably triisocyanates, in a known manner. Suitable triisocyanates are, for example, those obtainable by reacting 1 mol of trimethylolpropane with 3 mol of the isomer mixture of 2,4- and 2,6-diisocyanatotoluene, or biuret polyisocyanates of hexamethylene diisocyanate.

Particularly suitable polyurethanes are a polyurethane dispersion system based on a linear polyester urethane, preferably based on polyalkylene adipate or polyalkylene phthalate, having a molecular weight of 1000 to 8000, preferably of about 2000, and a diisocyanate, preferably toluylene diisocyanate or hexamethylene diisocyanate, and chain lengthening with diamines containing sulphonic acid or carboxylic acid groups, where appropriate as a mixture with aliphatic diamines. Further polyurethane components are polyurethane solutions based on polyester adipates, preferably polybutylene adipate or mixed polybutylene/polyhexamethylene adipate, having a molecular weight of 1000 to 8000 and hexamethylene diisocyanate, where appropriate as a mixture with isophorone diisocyanate in a ratio of 1 to 99:99 to 1, and where appropriate diol chain extenders and/or isophorone diamine. Further preferred polyurethanes are polyester urethane solutions preferably containing OH terminal groups and to which triisocyanates are added. Other preferred polyurethane solutions are those in which polyether urethane solutions having terminal NCO groups which have been reacted with amine-containing chain extenders are used.

In a preferred embodiment, the metal parts are coated, in the region of the encapsulation with plastic, with the PU system, to be employed according to the invention, based on polyalkylene adipinates and arylene diisocyanates having terminal NCO groups or with the addition of polyisocyanates to the PU systems, since these PU systems surprisingly have an intimate composite adhesion both to nonferrous metals such as gold, zinc, copper and alloys thereof, aluminium, chromium, vanadium, and to steel and iron, and likewise also to the best-known thermoplastics such as PVC, SAN, cellulose ester, polycarbonate, ABS, PPS, polysulphone, polyamide, PPO and polyalkylene terephthalate, and this composite adhesion also exists at the high temperatures of the plastic melt and is retained on cooling.

The polyurethane can be applied to the shaped metal articles in the dip coating, injection-moulding, knife-coating or pressure process, as a melt, probably however as a dispersion or solution, the intermediate layer to be applied only being necessary in the region of the encapsulation using thermoplastic. The amount of the dispersion or solution is calculated such that the thickness of the intermediate layer when dry is 2–80 μm, preferably 15–30 μm. Solvents or dispersants which are used, as appropriate, are dried by conventional methods. The PU layer provides thermoplastic coatings which are completely tack-free at room temperature.

The plastic layers preferably comprise polycarbonate, polyamide, polyalkylene terephthalate, polyarylene terephthalate, cellulose ester, PVC, polysulphone, polystyrene, polystyrene/acrylonitrile copolymers, ABS, polymethyl methacrylate, polyolefin, polyphenylene sulphide, polyoxymethylene and polyphenylene oxide.

Polycarbonates which are suitable according to the invention are those from aromatic polycarbonates having weight average molecular weights $\overline{M}w$ from 25,000 to 200,000, preferably from 30,000 to 120,000 and particularly from 30,000 to 80,000 ($\overline{M}w$ determined in $CH_2Cl_2$ at 20° C. and a concentration of 0.5 g per 100 ml).

Suitable linear polyaryl sulphones are all known aromatic polysulphones or polyether sulphones having $\overline{M}w$ (weight average molecular weight measured, for example, using light scattering) between about 15,000 and about 55,000, preferably between about 20,000 and about 40,000. Such polyaryl sulphones are described, for example, in DE-A-No. 1,719,244 and U.S. Pat. No. 3,365,517.

Suitable branched polyaryl sulphones are, in particular, the branched polyaryl ether sulphones according to DE-A-No. 2,305,413 and U.S. Pat. No. 3,960,815, whose $\overline{M}w$ (weight average molecular weight, measured, for example, using light scattering) is between about 15,000 and about 50,000, preferably between about 20,000 and 40,000. Thermoplastic polymethyl methacrylates are, for example, the plexiglas types available commercially. Thermoplastic acrylonitrile-/butadiene/styrene copolymers are, in particular, mixtures comprising (a) 50 to 70% by weight of one or more graft products and (b) 95 to 30% by weight of one or more thermoplastic resins.

Graft products (a) are preferably polymers which are obtained by polymerization of graft monomers in the presence of a rubber as graft base. The proportion of rubber is preferably 5 to 80% by weight, and also depends on the polymerization process.

As graft base, polybutadiene, natural rubber, butadiene/acrylonitrile copolymer and butadiene/styrene copolymer and block polymer are suitable, in particular. Acrylate/vinyl ether polymers and EPDM terpolymers can also be used. Graft monomers are mainly styrene mixtures comprising styrene and acrylonitrile, preferably in the weight ratio 90:10 and 50:50, mixtures of styrene and methyl (meth)acrylate, preferably in the weight ratio 5:95 to 95:5, and styrene/acrylonitrile-/methyl (meth)acrylate mixtures.

The production of such graft products is known per se. The graft monomers can be polymerized in emulsion in the presence of a rubber latex. The graft reaction is then initiated using a free-radical initiator. If the rubber is not crosslinked and if certain amount ratios of graft monomers and graft bases are maintained during the graft reaction, the size of the rubber particles in the latex is the determining factor for the particle size of the resulting graft polymer. The graft shell comprising chains, bonded chemically to the rubber particles, of the polymer of the graft monomers is relatively thin and does not significantly alter the size of the rubber particle. The $d_{50}$ value, i.e. the diameter above and below which in each case 50% of the diameters of the particles lie, is taken to mean the size here. The graft reaction is incomplete, so that its product is designated graft product. Besides the actual graft polymer, it also contains non-grafted copolymers of the graft monomers.

The graft polymers can also be prepared by bulk/solution or bulk/suspension polymerization, preferably from monomer-soluble rubber. The size of the graft rubber particles is then determined in the phase inversion stage and can be influenced mechanically (by stirring) and by chemical influencing of the phase equilibrium (addition of dispersing agents). In general, particles of diameter 1 pm or greater are obtained in the case of bulk/solution graft processes. The rubeer content of the graft product is limited to a maximum of 25% by weight.

According to the invention, products can be used whose particles have a size from 0.05 to 20 μm and those in which a major part of the graft monomers is included in the core of the rubber particles as a homopolymer or copolymer. Preferred particle sizes are 0.05 to 1.2 μm, particularly 0.05 to 0.6 μm. It is also possible to employ several different graft products simultaneously, for example two graft products which differ by the degree of grafting (or by the graft density), the particle size or by both simultaneously. A mixture comprising a graft product having particles of a $d_{50}$ size of 0.35 and 10 μm and a graft product having particles of a $d_{50}$ size from 0.05 to 0.32 μm is, for example, particularly suitable (ABS polymers thus prepared are also called bimodal systems).

The graft products preferably contain 35 to 80% by weight, particularly 40 to 70% by weight, of rubber and have $d_{50}$ particle sizes from 0.1 to 0.5 μm. They are employed in an amount such that the finished ABS polymer contains 5 to 25% by weight, preferably 5 to 20% by weight, of rubber.

The thermoplastic resin (b) forming the second component of the ABS polymer represents the continuous matrix and is a polymer or copolymer of styrene, α-methylstyrene/acrylonitrile/methyl (meth)acrylate or maleic anhydride. Polystyrene, styrene/acrylonitrile copolymers having an acrylonitrile content from 20 to 35% by weight, and methylstyrene/acrylonitrile copolymers having an acrylonitrile content from 20 to 31% by weight are preferred. The weight average ($\overline{M}_w$) of the molecular weight of these resins is 50,000 to 550,000; the molecular nonuniformity U.

$$\left( \frac{\overline{M}_w}{\overline{M}_n} - 1 = U \right) \text{ is } 1.0 - 3.5$$

($\overline{M}_n$ = number average of the molecular weight).

If a single graft product is used, it is advantageous for the quantitative composition of the graft monomers and that of the resin to be similar or identical. If a mixture of two graft products of different particle sizes is used, then it is advantageous for the quantitative composition of the graft monomers of the graft product having the coarser particles to be different from the composition of the resin.

The thermoplastic resins, for example styrene/acrylonitrile or α-methylstyrene/acrylonitrile copolymers, can be prepared by known processes, for example by bulk polymerization, solution polymerization, suspension polymerization and emulsion polymerization.

Graft product and thermoplastic resin are frequently prepared separately, both usually by emulsion polymerization. If the components are produced in latex form, the latices can be mixed and precipitated together.

Thermoplastic polystyrenes which are suitable for the preparation of the plastic coating are homopolymers of styrene or copolymers of styrene with, preferably, acrylonitrile and/or butadiene, and/or maleates which are obtained from the monomers or the mixture of monomers, for example by suspension polymerization in the presence of catalysts, with $\overline{M}_w$ from 10,000 to 600,000 ($\overline{M}_w$ is measured in DMF at c=5 g/l and 20° C.). (For literature on this, see: Beilsteins Handbuch der Organischen Chemie [Beilstein's Handbook of Organic Chemistry], 4th edition, 3rd supplement, vol. 5, pages 1163–1169, Springer Verlag 1964, H. Ohlinger, Polystyrol [Polystyrene], 1st part, Preparation Processes and Properties of the Products, Springer Verlag 1955.)

EXAMPLE 1

A plastic cap (cover for a temperature sensor in a cylindrical glass pipe) having a diameter of 15 mm and a length of 20 mm has 2 penetrating copper contacts in the region of the dome. A vapour pressure difference of 1.8 bar can occur between the interior of the glass pipe sealed with the plastic cap and the environment.

A polyurethane dispersion (Dispercoll® 8100 from BAYER AG, D 5090 Leverkusen) based on a hexanediol mixed polyester, an aromatic dicarboxylic acid, hexamethylene diisocyanate and a sulpho-containing diamine chain extender was used for the production of the PU adhesion promoter layer. The copper contact wires were dipped in the dispersion and dried, a PU adhesive layer having a thickness of about 25 mm being formed. The contact wires were then encapsulated with the plastics mentioned below in order to form the plastic cap.

Table 1 shows the results of the vapour pressure strength in the region of the electrode perforation with and without application of the PU layer according to the invention.

| Plastic employed | Execution at 1.5 bar vapour pressure difference | |
|---|---|---|
| | without PU adhesion promoter (comparison) | with PU adhesion promoter (according to the invention) |
| Polycarbonate | leaky | tight |
| Polyamide 6-6, nonreinforced | leaky | tight |
| Polyamide 6-6, 30% chopped glass fibres | | |
| ABS | leaky | tight |
| PPS | leaky | tight |
| PVC | leaky | tight |

EXAMPLE 2

A moisture-sensitive transistor is encapsulated with a thermoplastic material so as to be moisture-tight.

For the experiments according to the invention, the transistor is dipped in the polyurethane dispersion to be used according to the invention, dried, and subsequently encapsulated with the belowmentioned materials.

The polyurethane dispersion used was an approx. 30% strength anionic dispersion (Dispercoll® 8066 from BAYER AG, D 5090 Leverkusen) based on an adipic acid alkylenediol polyester having a molecular weight of approx. 2250, 2,4-toluylene diisocyanate and a sulpho-containing diamine.

This transistor is then subjected to the pressure cooker test for 100 hours. To this purpose, the component, in an autoclave which is filled with water and heated to 119.5° C., is exposed to this steam atmosphere for 100 hours. After this time, the autoclave is cooled, the air is removed if necessary, and the component is removed and subsequently subjected to the function test. The operability is then tested in comparison to the transistors which have been encapsulated with the same materials but had not previously been coated with the PU adhesion promoters according to the invention.

|  | Operability after pressure cooker test for 100 h | |
| --- | --- | --- |
| Plastic employed | without PU adhesion promoter (comparison) | with PU adhesion promoter (according to the invention) |
| Polycarbonate | defective | operating |
| ABS | defective | operating |
| PPS | defective | operating |
| PBT | defective | operating |

We claim:

1. An injection molded article comprised of a metal plastic composite bonded with a polyurethane adhesion promoter layer, where the layer has a thickness of 2 to 80μ and where the layer is formed from a polyurethane dispersion based on a linear polyester urethane, a diisocyanate and a diamine containing carboxylic acid or sulphonic acid groups chain extenders, a polyurethane solution based on polyalkylene adipate, hexamethylene diisocyanate and isophorone diamine chain extender, or a polyurethane solution based on a polyester urethane having terminal NCO groups which are reacted with an amine containing chain extender.

2. An injection molded article according to claim 1 wherein the layer has a thickness of 15 to 30 μm.

3. An injection-molded article according to claim 1, wherein the plastic is a thermoplastic based on cellulose ester, PVC, polyamide, polycarbonate, polysulphone, ABS, polymethyl methacrylate, polyphenylene sulphide, polyalkylene terephthalate, polyarylene terephthalate, polyphenylene oxide, polyphosphonate or polyether ester ketone.

4. An injection molded article according to claim 1 wherein the polyurethane adhesion promoter layer is formed from a polyurethane solution based on polybutylene adipate or polybutylene hexylene adipate having a molecular weight of 1000 to 8000 and hexamethylene diisocyanate.

5. An injection molded article according to claim 1 wherein the polyurethane adhesion promoter layer is formed form a polyurethane dispersion based on a polyalkylene adipate or polyalkylend phthalate having a molecular weight of 1000 to 8000 and toluylene diisocyanate or hexamethylene diisocyanate.

6. An injection molded article according to claim 5 further comprising the polyurethane adhesion promoter layer contains aliphatic diamines.

7. An injection molded article according to claim 5, wherein the polyalkylene adipate or polyalkylene phthalate has a molecular weight of approximately 2000.

* * * * *